May 1, 1962 G. CAMILLI ET AL 3,032,728
INSULATING AND COOLING ARRANGEMENT FOR ELECTRICAL APPARATUS
Filed Oct. 14, 1960
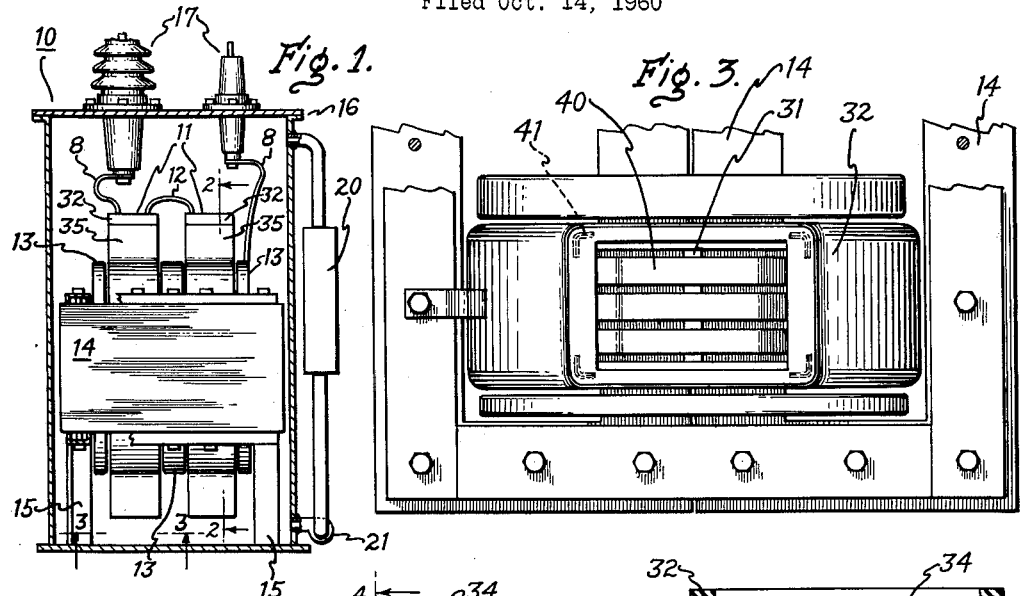
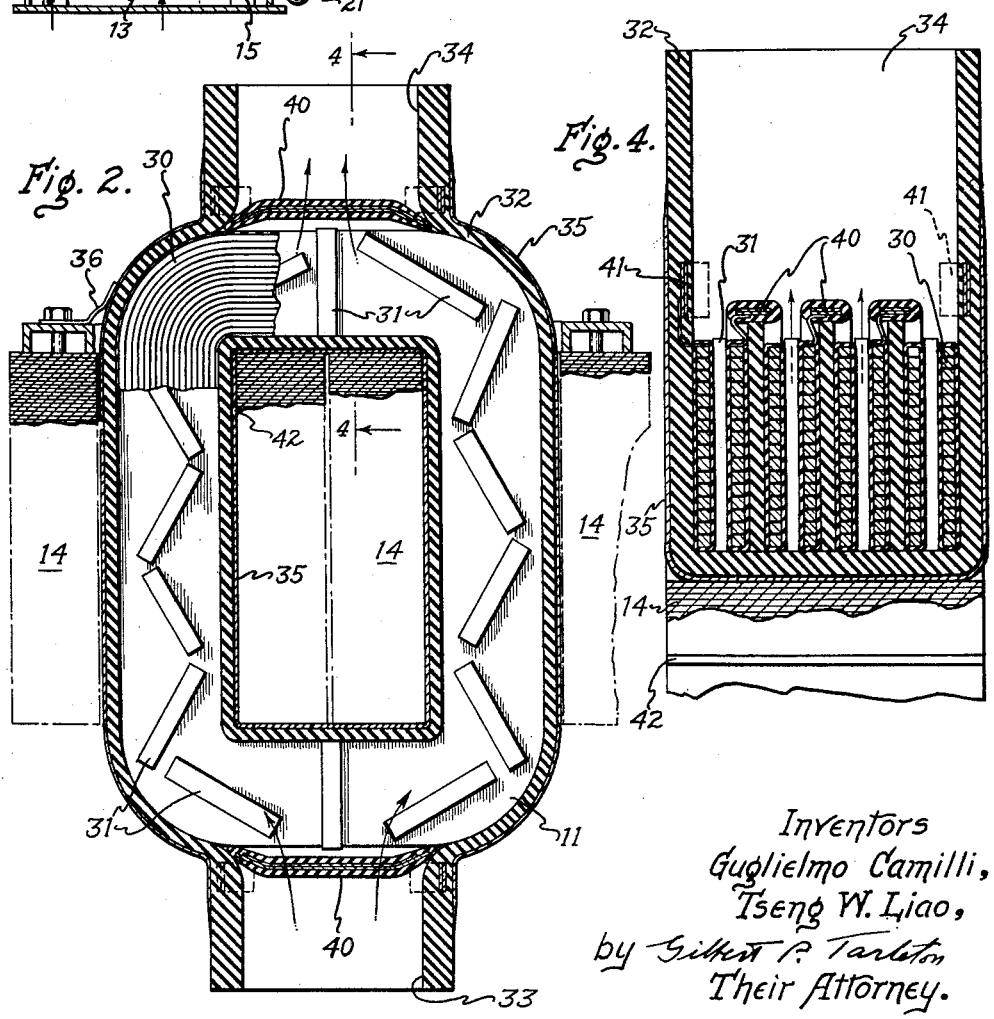
Inventors
Guglielmo Camilli,
Tseng W. Liao,
by Gilbert P. Tarleton
Their Attorney.

United States Patent Office 3,032,728
Patented May 1, 1962

3,032,728
INSULATING AND COOLING ARRANGEMENT
FOR ELECTRICAL APPARATUS
Guglielmo Camilli, Pittsfield, Mass., and Tseng W. Liao, Media, Pa., assignors to General Electric Company, a corporation of New York
Filed Oct. 14, 1960, Ser. No. 62,599
5 Claims. (Cl. 336—60)

This invention relates to electrical apparatus, and more in particular to an improved insulating arrangement for electrical apparatus of the type cooled by flow of a dielectric gas.

The development of gaseous fluoro compounds having a dielectric strength comparable to that of liquid dielectrics has made it theoretically possible to develop high voltage dry type electrical apparatus, such as transformers, in which the only insulating and cooling fluid is a gas. However, the use of such gases in commercial electrical apparatus has been hindered because of certain dielectric problems that arise when gases are used. For example, by necessity a gas insulated transformer requires a certain amount of solid insulation for mechanically supporting the windings and spacing the individual winding coils from each other and from the core. Thus, in gas insulated transformers, the insulating and cooling system for the transformer will necessarily include the combination of gaseous material and solid material.

It is a known phenomena that when a given voltage is applied across two dielectric materials in series, and the materials have different dielectric constants, the voltage across each material is inversely proportional to the dielectric constant of that material. Consequently, when a gas and solid insulating are located between portions of an electrical apparatus at different potentials, the gas will be stressed more highly than the solid insulation because the solid materials employed as insulation on such apparatus have much higher dielectric constants than any commercially employed dielectric gases. It therefore follows that in a gas insulated transformer, it is desirable either to use a minimum amount of solid insulation or to exclude the gas completely from those areas where high dielectric stresses occur and to employ only solid insulation in such areas.

The above principles have been recognized by the prior art, and various arrangements for accomplishing these desirable ends have been suggested by others. For example, United States Patent 2,422,037, assigned to the assignee of this invention, discloses an arrangement for separating transformer windings at different potentials by solid insulation only and providing cooling ducts for the flow of a fluid between members stressed at relatively low potentials. While arrangements of the type disclosed in the above patent work satisfactorily when sufficient expense can be incurred to keep manufacturing tolerances within very small limits, such arrangements are not suitable for apparatus in which cost must be kept to a minimum by allowing larger manufacturing tolerances. It has been found that manufacturing costs are greatly reduced when tolerances are increased slightly. However, the use of larger manufacturing tolerances results in numerous spaces occurring between the solid insulation and the elements at different potentials, and the gas that is located in these spaces ionizes very rapidly because of the high stress to which it is subjected. Consequently, the gas breaks down relatively easily and faults occur in the apparatus.

Accordingly, it is an object of this invention to provide an improved electrical apparatus.

Another object of this invention is to provide an improved insulating arrangement for gas cooled electrical apparatus.

A further object of this invention is to provide an insulating and cooling arrangement for electrical apparatus in which areas where gas will be subjected to high dielectric stress are substantially eliminated.

Another object of the invention is to provide an arrangement for neutralizing the gas break-down effect of closely adjacent members whose potential difference is large.

Other objects and advantages of the invention will be apparent from an examination of the specification, including the claims, taken in connection with the accompanying drawing.

According to one aspect of our invention, an arrangement for reducing the problems encountered when gas and solid insulation are employed in high voltage electrical apparatus can be achieved by encasing a high potential member in such apparatus in a solid insulation assembly which is surrounded by a metallic conducting layer that is grounded to the nearest member having a low potential, and by shielding portions of the high potential winding that are exposed to low potential areas.

In the drawings:

FIG. 1 is a partially cross-sectional diagrammatical representation of apparatus embodying principles of our invention.

FIG. 2 is an enlarged cross-sectional view taken along the lines 2—2 in FIG. 1.

FIG. 3 is an enlarged view taken along the lines 3—3 in FIG. 1.

FIG. 4 is an enlarged cross-sectional view taken along the line 4—4 in FIG. 2.

Referring now to FIG. 1 of the drawing, the principles of the invention are illustrated by reference to a sealed shell-type transformer 10, is being understood that the following principles can be applied to other types of transformer construction. The transformer 10 has a high voltage winding 11 comprising spaced groups of turns connected by a lead 12, and a low voltage winding 13 comprising spaced groups of turns, the windings 11 and 13 being surrounded by a magnetic core 14 according to conventional practice. The core and winding assembly may be supported by suitable structural members 15. The transformer may be sealed in an enclosure 16, which is provided with bushings 17 connected to the windings by leads 8. The enclosure 16 may be provided with openings for connecting the interior thereof to external heat exchange means 20, which may be associated with blower means 21 for circulating a large volume of a gaseous cooling medium through the enclosure 16.

In FIGS. 3 and 4, the high voltage winding is shown to comprise a plurality of layers 30 of axially spaced turns of insulated conductor material that are separated by elongated spacer elements 31. The spacer elements 31 may be affixed to sheets of paper placed between the winding layers 30. The high voltage windings 11 are encased in solid insulating material so as to provide insulation assemblies 32. The insulation assemblies 32 may be fabricated, for example, by wrapping each high voltage winding 11 with continuous strips of insulating tape. Each assembly 32 is provided with a fluid in-take duct 33 and a fluid outlet duct 34 to provide fluid channels for the gaseous cooling medium of the transformer. The ducts 33 and 34 may be fabricated, for example, by wrapping the tape used for encasing the windings around cylinders of insulating material placed on the ends of the windings. The spacers 31 may be arranged so as to have intersecting axes in order to provide a tortuous fluid flow path for the gas passing between the conductor layers 30. This will result in turbulence in the gas stream which will enable the gas to absorb more heat from the winding as it passes therethrough. By constructing the insulation assembly 32 in the manner illustrated in the drawing, the flow of gas through the windings 11 is increased by the chimney effect of the vertically oriented ducts 33 and 34 adjacent the heat generating winding. The insulation assembly 32 may be substantially enclosed in a sheet or layer 35 of metallic conducting material except, perhaps, for the extremities of the ducts 33 and 34. The layer 35 may be a coating of metal applied by spraying or dipping, or the layer may be produced by tightly wrapping strips of metal foil around the insulation assembly 32. Regardless of the method of fabrication, the layer 35 must be in substantially continuous contact with the entire outside surface of the insulation assembly 32 in order to eliminate any spaces where gas pockets can form. However, a narrow gap 42 may be provided in the layer or sheet 35 in order to avoid having a short-circuited turn. The layer 35 is grounded to the core assembly by a lead 36. This results in the exterior of the insulation assembly 32 being at the same electrical potential as the adjacent core leg, which is the closest member whose potential difference is large. This arrangement has advantages which will be explained in paragraphs that follow.

As shown in FIGS. 2 and 4, portions of the windings 11 adjacent the ducts 33 and 34 will be exposed through the opening in the ducts. This will result in the stressing of the gaseous insulation relatively highly in these areas because the exposed portions of the high voltage windings 11 will be facing a ground plane. To overcome difficulties such as the formation of corona on the edge of the outermost turn of conductor material, the portions of the winding exposed in the duct openings are connected to shields 40 and 41. The shields 40 are heavily insulated conductors which are aligned with the winding layers 30 so that they do not block the gas flow channels between the individual winding layers. The endmost layers 30 may be shielded by connecting them to metallic inserts 41 imbedded in the solid insulation assembly 32.

The insulating and cooling system for a transformer constructed as described in the previous paragraphs includes solid insulation for separating those areas of the apparatus at different electrical potentials. The cooling medium is entirely a gas or a mixture of gases that is not condensable in the normal operating temperature range for the apparatus. For example, in a shell type transformer of the type described above, the gas may be nitrogen or an electronegative gas, such as sulfur hexafluoride, since these gases have condensation temperatures well below any operating temperatures encountered by such apparatus.

The various members of the apparatus at different electrical potentials are assembled as close together as the manufacturing tolerances encountered in fabricating such apparatus will permit. The ideal situation would be for such members to be in continuous contact with each other along all touching surfaces thereof so that there could be no gas spaces in between them. However, it is recognized that cost considerations prevent the use of manufacturing tolerances small enough to accomplish this desirable result. Consequently, those portions of the apparatus where the electrical potential difference is likely to be sufficient to ionize or break down any small gas pockets that occur between members are electrically neutralized so that they are at the same potential. This results in the portions of the apparatus at large potential differences being separated only by solid insulation. For example, the greatest potential difference in the above described shell type transformer occurs between the high voltage windings 11 and the core 14, which is essentially at ground potential. The voltage breakdown effect of this potential difference on any gas spaces between these members has been eliminated by encasing the winding in a thick solid insulation assembly 32 and then surrounding the solid insulation assembly with a metallic conducting layer 35 that is grounded to the core 14. Consequently, the areas of greatest potential difference will then occur between the grounded conducting layer 35 and the high voltage winding 11. Since these portions of the apparatus are separated only by a thick layer of solid insulation material, there will be no gas between them to break down. Also, the areas where the gas will be stressed highly because the high voltage winding is opposite a ground plane, such as in the openings in the ducts 33 and 34 have been provided with heavily insulated shields 40 and 41 that will prevent the formation of corona or the overstressing of the gas. Thus, by constructing apparatus in accord with the teachings of my invention, the size, weight and cost of such apparatus may be reduced because the various elements thereof are placed as close together as manufacturing tolerances will permit, and the entire apparatus is cooled by a gaseous medium rather than a liquid medium.

It will be understood, of course, that while the forms of the invention herein shown and described constitute preferred embodiments of the invention, it is not intended herein to illustrate all of the equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. In sealed electrical apparatus of the type having a fluid cooling medium which consists entirely of gas that is non-condensable in the operating temperature range of the apparatus, the combination comprising a first member at ground potential, a second high voltage member closely adjacent said first member, the potential difference between said first and second members being sufficient to breakdown said gas, said second member comprising a plurality of spaced layers of insulated conductor material, said spaced layers being separated so as to provide a gas flow channel therebetween, said second member being encased in a solid insulation assembly except for ducts at opposite ends of the assembly, the duct communicating with said channel, said solid insulation assembly being substantially completely surrounded by an electrical conducting layer in contact with the outside surface thereof, said conducting layer being grounded to said first member, and means connected to said spaced layers for shielding portions of said spaced layers exposed through said ducts.

2. In electrical apparatus of the type contained in a sealed enclosure and having a fluid cooling medium which consists entirely of gas that is non-condensable in the operating temperature range of the apparatus, the combination comprising a first member at ground potential, a second high voltage member closely adjacent said first member, the potential difference between said first and second members being sufficient to breakdown said gas, said second member comprising a plurality of spaced layers of insulated conductor material, said layers being separated so as to provide gas flow channels therebetween, said second member being encased in a solid insulation assembly except for ducts at opposite ends of the assembly, said ducts opening away from said first member and communicating with said channels, external heat exchanger means in communication with the interior of said enclosure, blower means between said enclosure and said heat exchange means for circulating said gas, said solid insulation assembly being substantially completely surrounded by a sheet of metallic conducting material in contact with the outside surface thereof, said sheet being grounded to said first member, and means connected to said layers for shielding portions of said layers exposed through said ducts.

3. In electrical apparatus of the type contained in a sealed enclosure and having a fluid cooling medium which consists entirely of gas that is non-condensable in the operating temperature range of the apparatus, the combination comprising a first member at ground potential, a second high voltage member closely adjacent said first member, the potential difference between said first and second members being sufficient to breakdown said gas, said second member comprising a plurality of spaced layers of insulated conductor material, said layers being separated by elongated spacer elements arranged so that their axes intersect to provide a tortuous gas flow channel through said second member, said second member being encased in a solid insulation assembly except for ducts at opposite ends of the assembly, said ducts opening away from said first member and communicating with said channel, external heat exchanger means communicating with the interior of said enclosure, blower means for circulating said gas through said enclosure and heat exchanger means, said solid insulation assembly being substantially completely surrounded by a sheet of metallic conducting material in contact with the outside surface thereof, said sheet being grounded to said first member, and means connected to said layers for shielding portions of said layers exposed through said ducts.

4. In electrical apparatus of the type contained in a sealed enclosure and having a fluid cooling medium which consists entirely of gas that is non-condensable in the operating temperature range of the apparatus, the combination comprising a first member at ground potential, a second high voltage member closely adjacent said first member, the potential difference between said first and second members being sufficient to breakdown said gas, said second member comprising a plurality of spaced layers of insulated conductor material, said layers being separated by spacer elements arranged so as to provide tortuous gas flow channels therebetween, said second member being encased in a solid insulation assembly except for ducts at opposite ends of the assembly, said ducts opening away from said first member and communicating with said channels, external heat exchanger means in communication with the interior of said enclosure, blower means between said enclosure and said heat exchange means for circulating said gas, said solid insulation assembly being substantially completely surrounded by a sheet of metallic conducting material in contact with the outside surface thereof, said sheet being grounded to said first member, insulated conductor means in said ducts connected to a plurality of the conductor layers for shielding portions of said layers exposed through said ducts, and a metallic shield element imbedded in said insulation assembly adjacent a duct for shielding an exposed endmost layer.

5. In electrical apparatus of the type contained in a sealed enclosure and having fluid cooling medium which consists entirely of a gas that is non-condensable in the operating temperature range of said transformer, the combination comprising a first member at ground potential, a second high voltage member closely adjacent said first member, the potential difference between said members being sufficient to break down said gas, said second member comprising a plurality of spaced layers of insulated conductor material, said layers being separated by elongated spacer elements arranged so that their axes intersect to provide tortuous gas flow channels through said second member, said second member being completely encased in a solid insulation assembly except for ducts at opposite ends of the assembly, said ducts being vertically aligned and communicating with said channels to produce a chimney through said second member, external heat exchanger means in communication with the interior of said enclosure, blower means between said enclosure and said heat exchanger means for circulating said gas, said insulation assembly being substantially completely surrounded by a sheet of metallic conducting material in contact with the outside surface thereof, said sheet being grounded to said first member, heavily insulated conductor means in said ducts connected to a plurality of conductor layers for shielding those portions of said layers exposed through said ducts, and metallic shield elements imbedded in said insulation assembly adjacent said ducts for shielding the exposed endmost conductor layers.

No references cited.